United States Patent [19]
McGarrah

[11] Patent Number: 5,924,615
[45] Date of Patent: Jul. 20, 1999

[54] HANGING STORAGE BOX FOR TRUCK BEDS

[76] Inventor: Tony D. McGarrah, HC 01 Arenosa Creek Estates, #27, Inez, Tex. 77968

[21] Appl. No.: 08/803,429

[22] Filed: Feb. 20, 1997

[51] Int. Cl.$^6$ ................................. B60R 7/00; B60R 9/00
[52] U.S. Cl. .......................... 224/404; 224/560; 224/561; 296/37.6; 220/482
[58] Field of Search ..................................... 224/404, 428, 224/429, 430, 526, 527, 560, 561; 296/37.6; 220/482; D12/420, 421, 422, 423, 424

[56] References Cited

U.S. PATENT DOCUMENTS

| | | | |
|---|---|---|---|
| D. 294,935 | 3/1988 | Grossman | D12/157 |
| 2,488,263 | 11/1949 | Bishman | 224/404 |
| 4,728,017 | 3/1988 | Mullican | 224/404 |
| 4,848,626 | 7/1989 | Waters | 224/273 |
| 5,685,467 | 11/1997 | Niemi et al. | 224/404 |

*Primary Examiner*—David J. Walczak
*Assistant Examiner*—Timothy L. Maust

[57] ABSTRACT

A hanging storage box for truck beds comprises a main housing having a hollow interior, a lid, a floor, a front wall, a rear wall and two side walls, the lid including a top surface and four side edges extending therefrom, the lid being coupled to the rear wall by a plurality of hinges, the lid being couplable to the front wall by a securing device, each side wall including a handle; and a plurality of hanger members each being formed with a short side member and a long side member, the long side member including a plurality of adjustment apertures therethrough, each hanger member being coupled to the rear wall of the main housing, the adjustment apertures allowing a user to mount the hanger members at a variety of different heights, in an operative orientation a user suspending the main compartment from a wall of a truck bed.

1 Claim, 4 Drawing Sheets

HANGING STORAGE BOX FOR TRUCK BEDS

BACKGROUND OF THE INVENTION

1. Field of the Invention

The present invention relates to a hanging storage box for truck beds and more particularly pertains to suspending a storage box from a truck bed with releasably couplable hanger members.

2. Description of the Prior Art

The use of storage containers for trucks is known in the prior art. More specifically, storage containers for trucks heretofore devised and utilized for the purpose of mounting a box into the bed of a truck are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,728,017 to Mullican discloses a clamp-on storage container for pickup trucks.

U.S. Pat. No. 4,215,896 to Drouin discloses a box for a pick-up vehicle.

U.S. Pat. No. 5,052,737 to Farmer, Jr. discloses an attachment structure and method for securing a toolbox on a pickup truck.

U.S. Pat. No. 3,640,423 to Parker et al. discloses a toolbox for a pickup truck.

U.S. Pat. No. Des. 349,091 to Dickinson disclose a truck bed tool box.

U.S. Pat. No. 4,770,330 to Bonstead et al. discloses a multi-piece straddle bed tool box for use with pickup trucks.

While these devices fulfill their respective, particular objective and requirements, the aforementioned patents do not describe a hanging storage box for truck beds for suspending a storage box from a truck bed with releasably couplable hanger members.

In this respect, the hanging storage box for truck beds according to the present invention substantially departs from the conventional concepts and designs of the prior art, and in doing so provides an apparatus primarily developed for the purpose of suspending a storage box from a truck bed with releasably couplable hanger members.

Therefore, it can be appreciated that there exists a continuing need for new and improved hanging storage box for truck beds which can be used for suspending a storage box from a truck bed with releasably couplable hanger members. In this regard, the present invention substantially fulfills this need.

SUMMARY OF THE INVENTION

In the view of the foregoing disadvantages inherent in the known types of storage containers for trucks now present in the prior art, the present invention provides an improved hanging storage box for truck beds. As such, the general purpose of the present invention, which will be described subsequently in greater detail, is to provide a new and improved hanging storage box for truck beds and method which has all the advantages of the prior art and none of the disadvantages.

To attain this, the present invention essentially comprises a new and improved hanging storage box for truck beds comprising, in combination: a main housing formed in a generally rectangular configuration with a hollow interior, a lid, a floor, a long front wall, a long rear wall and two narrow side walls, each of the walls having an upper extent including a upwardly extending flange extending therearound, the lid including a top surface and four side edges extending in a outwardly angled orientation with respect to the top surface, the top surface of the lid including a plurality of raised ribs, the lid being coupled to the rear wall by a plurality of hinges, the lid being securable to the front wall by a lock, in a closed orientation the flange being positioned within the lid, each side wall including a generally triangular shaped indentation defining a handle, each handle having an upper extent defining a ledge within the interior of the housing, the rear wall of the housing including a plurality of mounting apertures therein and having a lower extent including a generally semicylindrical shaped projection member extending therefrom; a compartmentalized tray being formed in a generally rectangular configuration with long front and rear walls and two narrow side walls, the tray being positioned within the interior of the main housing upon the ledge, the tray including two short horizontal dividers and two long vertical dividers, each vertical divider being affixed between the front and rear walls, each horizontal divider being affixed between a vertical divider and a side wall; three hanger members each being formed in a inverted U-shaped configuration with a short side member, a long side member and a top member, the long side member including a plurality of adjustment apertures therethrough, each hanger member being coupled to the rear wall of the main housing by a pair of nuts and bolts extending through the adjustment apertures in the long side member and mounting apertures in the rear wall of the main housing, the adjustment apertures allowing a user to mount the hanger members at a variety of different heights; and three anti-theft bolts each being formed in an elongated cylindrical configuration with an inboard end and an outboard end, the inboard end of each bolt including a turn screw coupled thereupon, the outboard end of each bolt including a suction cup coupled thereto, each bolt being positioned through the adjustment apertures in the long side member of the hanger member and mounting apertures in the rear wall of the main housing with the inboard end being positioned in the interior of the main housing and the outboard end being positioned within the hanger member, the anti-theft bolts securing the main compartment to a wall of a truck bed, in an operative orientation a user suspending the main compartment from a wall of a truck bed and rotating the turn key of the anti-theft bolt thereby securing the main compartment to a wall of a truck bed.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hanging storage box for truck beds which has all the advantages of the prior art storage containers for trucks and none of the disadvantages.

It is another object of the present invention to provide a new and improved hanging storage box for truck beds which may be easily and efficiently manufactured and marketed.

It is a further object of the present invention to provide a new and improved hanging storage box for truck beds which is of durable and reliable construction.

An even further object of the present invention is to provide a new and improved hanging storage box for truck beds which is susceptible of a low cost of manufacture with regard to both materials and labor, and which accordingly is then susceptible of low prices of sale to the consuming public, thereby making such a hanging storage box for truck beds economically available to the buying public.

Still yet another object of the present invention is to provide a new and improved hanging storage box for truck beds which provides in the apparatuses and methods of the prior art some of the advantages thereof, while simultaneously overcoming some of the disadvantages normally associated therewith.

Even still another object of the present invention is to provide a new and improved hanging storage box for truck beds for suspending a storage box from a truck bed with releasably couplable hanger members.

Lastly, it is an object of the present invention to provide a new and improved hanging storage box for truck beds comprising: a main housing having a hollow interior, a lid, a floor, a front wall, a rear wall and two side walls, the lid including a top surface and four side edges extending therefrom, the lid being coupled to the rear wall by a plurality of hinges, the lid being couplable to the front wall by a securing device, each side wall including a handle; and a plurality of hanger members each being formed with a short side member and a long side member, the long side member including a plurality of adjustment apertures therethrough, each hanger member being coupled to the rear wall of the main housing, the adjustment apertures allowing a user to mount the hanger members at a variety of different heights, in an operative orientation a user suspending the main compartment from a wall of a truck bed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
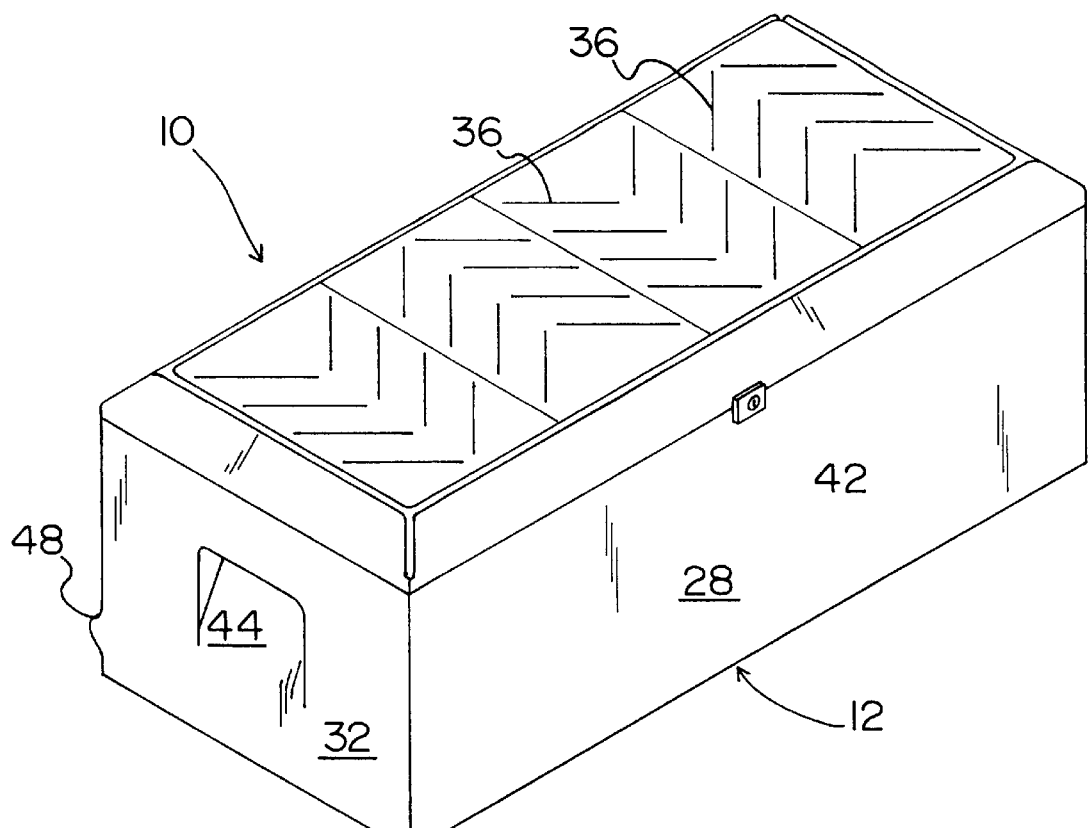
FIG. 1 is a perspective view of the preferred embodiment of the hanging storage box for truck beds constructed in accordance with the principles of the present invention.

With reference now to the drawings, and in particular, to FIG. 1 thereof, the preferred embodiment of the new and improved hanging storage box for truck beds embodying the principles and concepts of the present invention and generally designated by the reference number 10 will be described.

Specifically, it will be noted in the various Figures that the device relates to a hanging storage box for truck beds 10. In its broadest context, the device consists of a main housing 12, a compartmentalized tray 14, hanger members 16 and anti-theft bolts 18. Such components are individually configured and correlated with respect to each other so as to attain the desired objective.

Figure 6:
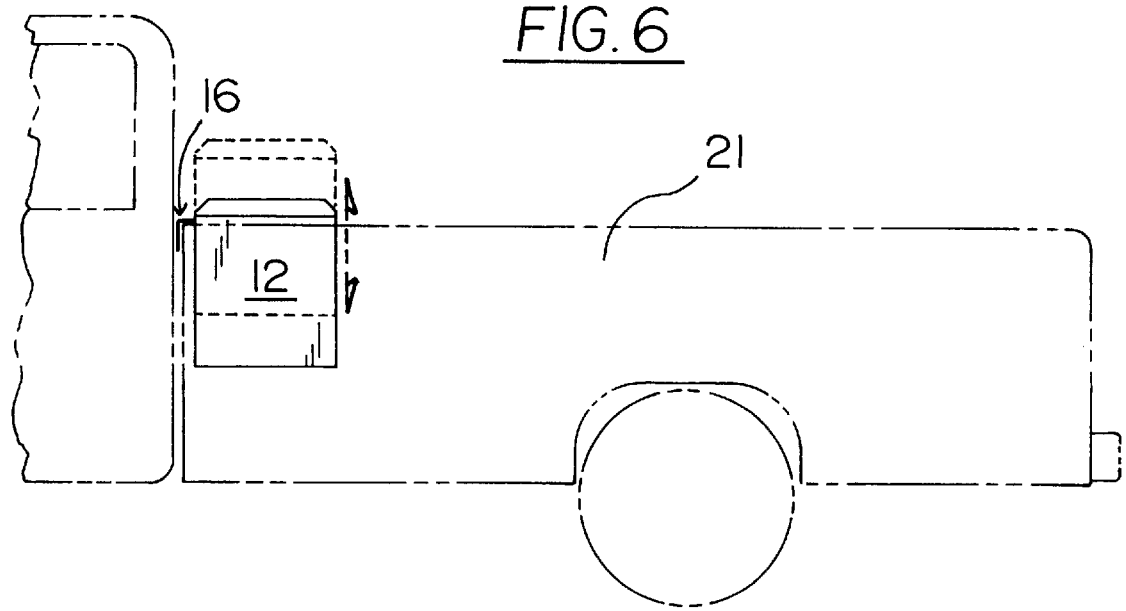
FIG. 6 is a perspective view illustrating the positioning of the apparatus relative to a truck bed.

The primary embodiment of the apparatus is adapted to contain tools and is designed for use in association with a conventional pick up truck bed 21. The apparatus can also be used with campers, contemporary "chopped" custom trucks, step side trucks, small trucks, etc. Note FIG. 6.

Figure 3:
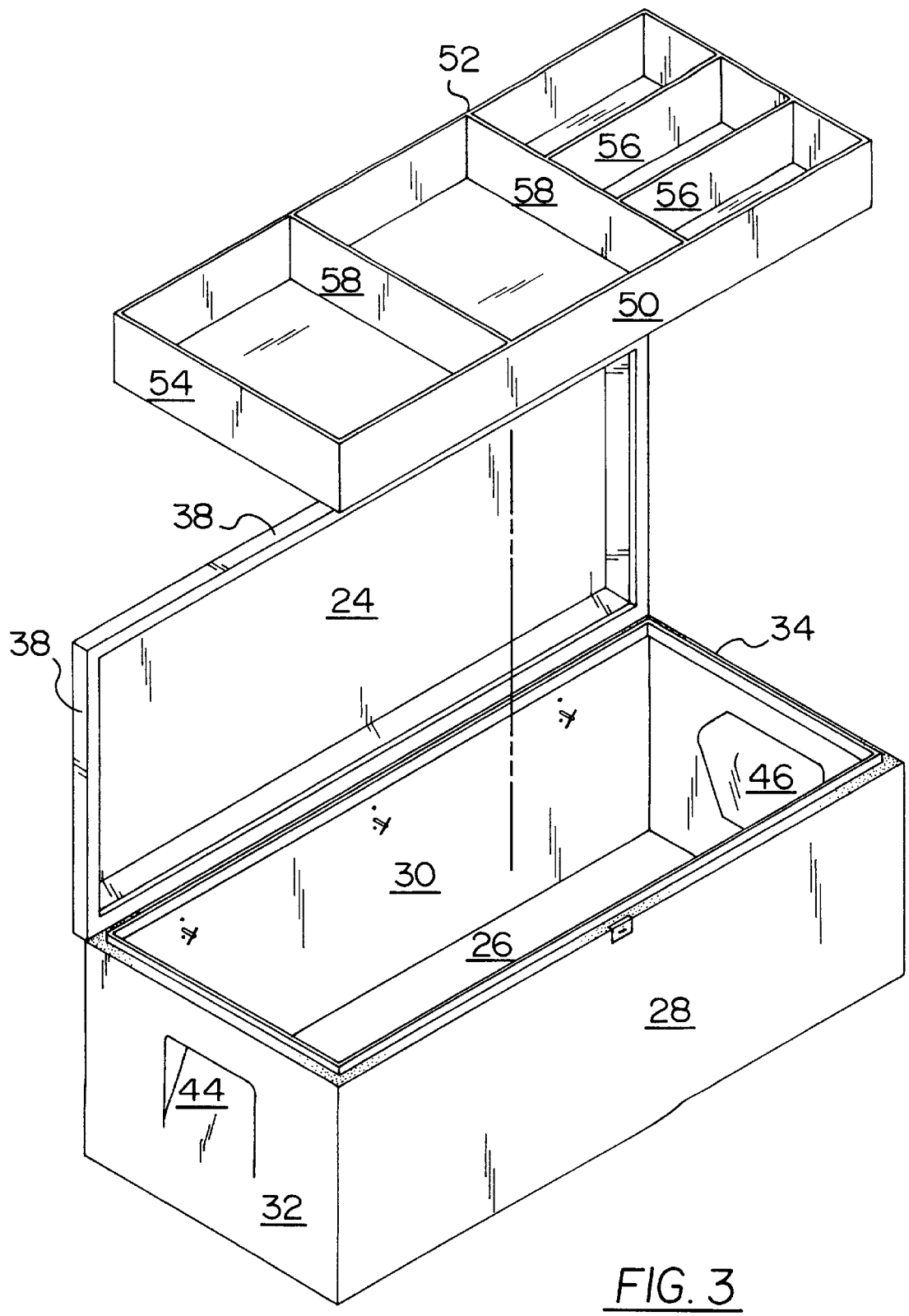
FIG. 3 is a perspective view of the apparatus illustrating the positioning of the compartmentalized tray.

The main housing 12 is formed in a generally rectangular configuration with a hollow interior, a lid 24, a floor 26, a long front wall 28, a long rear wall 30 and two narrow side walls 32. Each of the walls has an upper extent which includes an upwardly extending flange 34. The lid 24 includes a top surface and four side edges 38 which extend in an outwardly angled orientation with respect to the top surface. This configuration facilitates the draining of rain water and other precipitation. The top surface of the lid includes a plurality of raised ribs 36. The ribs are arranged in a series of V-shaped columns. The ribs provide a secure gripping surface for users when utilizing the apparatus as a step. Note FIGS. 1 and 3.

The lid is coupled to the rear wall by a plurality of hinges 40. The lid is securable to the front wall by a lock 42. In the primary embodiment a conventional key lock is utilized. In alternate embodiments a combination or electronic lock can be utilized. In a closed orientation, the flange 34 of the side walls is positioned within the lid 24. This configuration provides a tight, waterproof coupling between the lid and the side walls. Note FIGS. 1 and 3.

Figure 2:
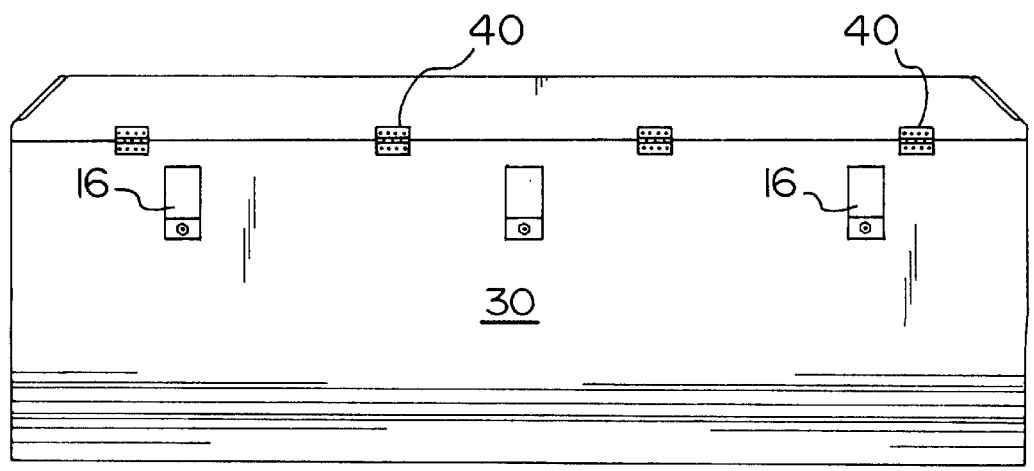
FIG. 2 is a rear perspective view illustrating the hinges of the apparatus.

Each side wall includes a generally triangular shaped indentation defining a handle 44. The handles are sized and shaped to enable a user to easily lift, remove and carry the apparatus when desired. Each handle has an upper extent which defines a flat ledge 46 within the interior of the housing. These ledges provide a secure support surface for the compartmentalized tray. The rear wall of the housing includes a plurality of mounting apertures and has a lower extent which includes a generally semicylindrical shaped projection member 48 extending from it. The projection member has a thickness approximately equal to that of the hanger members. This configuration allows the apparatus to hang vertically and minimizes banging of the apparatus against a truck bed wall. This protects the wall from damage. Note FIGS. 1 and 2.

A compartmentalized tray 14 is formed in a generally rectangular configuration with long front 50 and rear 52 walls and two narrow side walls 54. The tray is positionable within the interior of the main housing upon the ledge. In the preferred embodiment of the apparatus tools are stored on the tray. The tray includes two short horizontal dividers 56 and two long vertical dividers 58. Each vertical divider 58 is affixed between the front and rear walls. Each horizontal divider 56 is affixed between a vertical divider and a side wall. Note FIG. 3.

Figure 4:
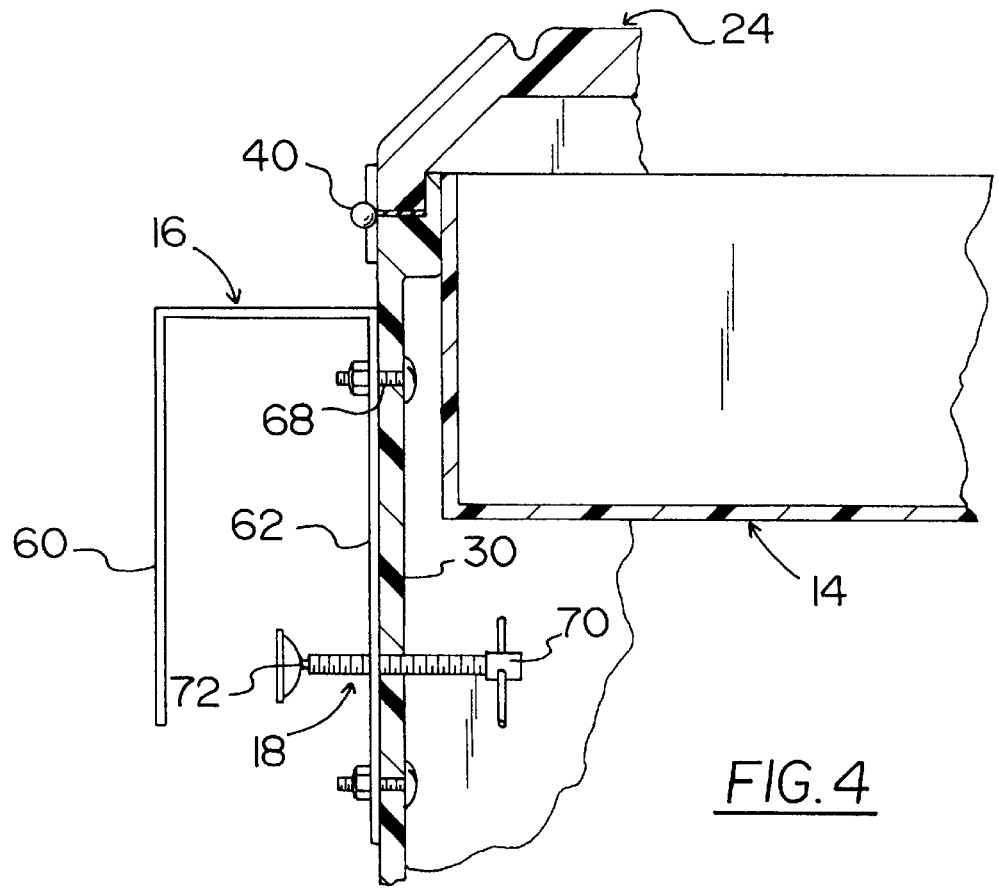
FIG. 4 is a cross-sectional view of the apparatus illustrating a hanger bracket and an anti-theft bolt.
Figure 5:
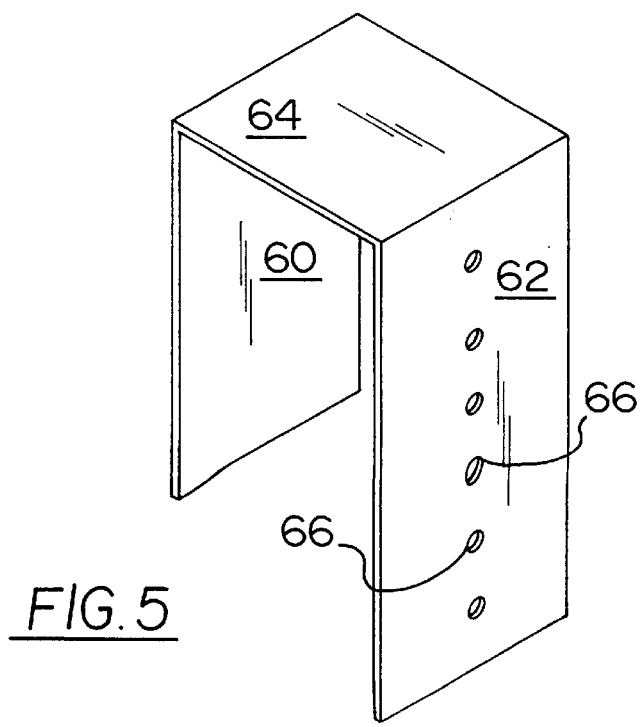
FIG. 5 is a enlarged perspective view of a hanger bracket of the apparatus.

Three hanger members 16 are each formed in a inverted U-shaped configuration with a short side member 60, a long side member 62 and a top member 64. The long side member includes a plurality of adjustment apertures 66. Each hanger member is coupled to the rear wall of the main housing by a pair of nuts and bolts 68 which extend through the adjustment apertures in the long side member 62 and mounting apertures in the rear wall of the main housing. The adjustment apertures 66 allow a user to mount the hanger members at a variety of different heights. This allows a user to utilize the apparatus in a variety of truck beds with varying depths. The apparatus is suspended above the floor of a truck bed, therefore enabling a user to place wood or other items along the floor of the bed without moving the apparatus. Note FIGS. 4–6.

Three anti-theft bolts 18 are each formed in an elongated cylindrical configuration with an inboard end and an outboard end. The inboard end of each bolt includes a turn screw 70. The outboard end of each bolt 18 includes a suction cup 72 which is threadedly coupled to the bolt 18. Each bolt 18 is positioned through one of the adjustment apertures in the long side member of the hanger member and mounting apertures in the rear wall of the main housing. A user uncouples the suction cups from the bolts 18 and reassembles the bolts through different adjustment apertures to change the height of the storage box. The inboard ends of the anti-theft bolts are positioned in the interior of the main housing and the outboard ends are positioned within the hanger member. The anti-theft bolts secure the main compartment to a wall of a truck bed. A user can secure the anti-theft bolts within the main compartment and lock the lid. This prevents the unintentional release of the apparatus, preventing its theft. In an operative orientation a user suspends the main compartment from a wall of a truck bed and rotates the turn key of the anti-theft bolt. This action secures the main compartment of the apparatus to the a wall of a truck bed. Note FIGS. 1–5.

Figure 7:
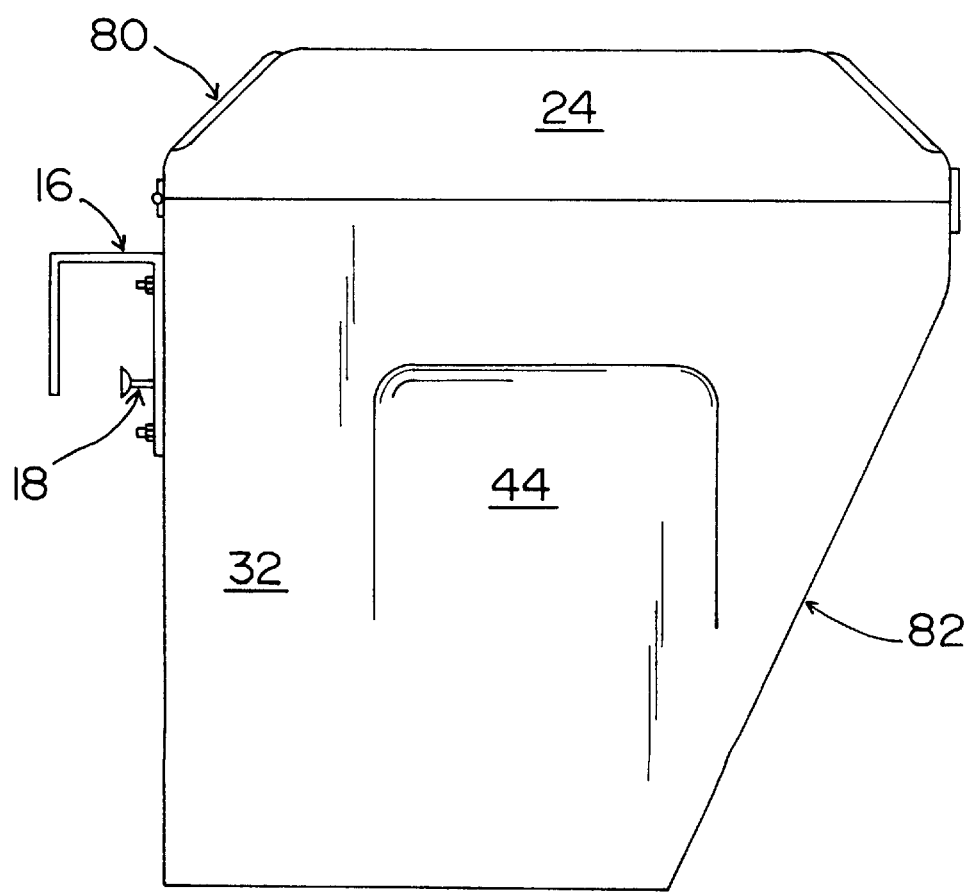
FIG. 7 is a side perspective view of an alternative embodiment of the apparatus.

A second embodiment of the present invention is shown in FIG. 7 and includes substantially all of the components of the present invention. In such embodiment 80 the front wall 82 of the main housing 12 is angled inwardly between thirty and sixty degrees with respect to the lid. This enables a user to place larger objects in front of the apparatus adjacent its base. The alternative embodiment is particularly useful in smaller trucks. Note FIG. 7.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved hanging storage box for truck beds comprising, in combination:

a main housing formed in a generally rectangular configuration with a hollow interior, a lid, a floor, a long front wall, a long rear wall and two narrow side walls, each of the walls having an upper extent including an upwardly extending flange extending therearound, the lid including a top surface and four side edges extending in a outwardly angled orientation with respect to the top surface, the top surface of the lid including a plurality of raised ribs, the lid being coupled to the rear wall by a plurality of hinges, the lid being securable to the front wall by a lock, in a closed orientation the flange being positioned within the lid, each side wall including a generally triangular shaped indentation defining a handle, each handle having an upper extent defining a ledge within the interior of the housing, the rear wall of the housing including a plurality of discrete mounting apertures therein and having a lower extent including a generally semicylindrical shaped projection member extending therefrom;

a compartmentalized tray being formed in a generally rectangular configuration with long front and rear walls and two narrow side walls, the tray being positioned within the interior of the main housing upon the ledge, the tray including two short horizontal dividers and two long vertical dividers, each vertical divider being affixed between the front and rear walls, each horizontal divider being affixed between a vertical divider and a side wall;

three hanger members each being formed in an inverted U-shaped configuration with a short side member, a long side member and a top member, the long side member including a plurality of adjustment apertures therethrough, each hanger member being coupled to the rear wall of the main housing by a pair of nuts and bolts extending through the adjustment apertures in the long side member and mounting apertures in the rear wall of the main housing, the adjustment apertures allowing a user to mount the hanger members at a variety of different heights; and three anti-theft bolts each being formed in an elongated cylindrical configuration with an inboard end and an outboard end, the inboard end of each bolt including a turn screw coupled thereupon, the outboard end of each bolt including a suction cup coupled thereto, each bolt being positioned through the adjustment apertures in the long side member of the hanger member and mounting apertures in the rear wall of the main housing with the inboard end being positioned in the interior of the main housing and the outboard end being positioned within the hanger member, the anti-theft bolts securing the main housing to a wall of a truck bed, in an operative orientation a user suspending the main housing from a wall of a truck bed and rotating the turn key of the anti-theft bolt thereby securing the main housing to a wall of a truck bed.

* * * * *